Apr. 10, 1923.

F. G. HURST 1,451,394

FISH SCREEN

Filed Nov. 1, 1921

Inventor:
FREDERICK G. HURST.
by Wm H Babcock & Son
Att'ys.

Patented Apr. 10, 1923.

1,451,394

UNITED STATES PATENT OFFICE.

FREDERICK G. HURST, OF PORTLAND, OREGON.

FISH SCREEN.

Application filed November 1, 1921. Serial No. 511,994.

*To all whom it may concern:*

Be it known that I, FREDERICK G. HURST, a citizen of the United States, residing at Portland, in the county of Multnomah and State of Oregon, have invented certain new and useful Improvements in Fish Screens, of which the following is a specification.

The present invention relates to the screening of irrigation ditches and more particularly to fish screens adapted to prevent the passage of fish from one ditch to another, especially in the direction of flow of the outflowing water. The main purpose of such devices is to confine the fish to the larger branches and main ditches of the irrigation system where they will always have ample water and plenty of room.

Among the more serious objections to the various devices of this general class are the cost of manufacture; failure to prevent the passage of fish; collection of debris in or about the device with consequent inoperativeness; lack of uniformity of flow or of rate of flow of the water into the device; and instability of the device due to the currents in the ditch and the change of level of water.

The main objects of this invention are to overcome the above and other objections and provide a simple, compact, stable, efficient, and reliable fish screen which will operate under all conditions and will prevent the passage of fish either up or down stream; while at the same time being inexpensive in production and easy to install.

Heretofore, one type of device used has been a floating outlet so constructed and arranged that it floated close to the surface of the water, the water flowing over its edge with a swirling motion and an audible sound. The swirling motion of the water and the sound made by it were relied upon to scare the fish back so that they would not pass in the down-stream direction through the device—i. e. so that they would not enter the upper part or outlet end. There was no provision against passage in the other direction. The present device relies on tangible obstructions to the passage of the fish in either direction, as contrasted with the above intangible ideas.

In order to more clearly disclose the construction, operation, and use of the invention, reference should be had to the accompanying drawings forming part of the present application. Throughout the several figures of the drawings like reference characters designate the same parts.

Figure 1:
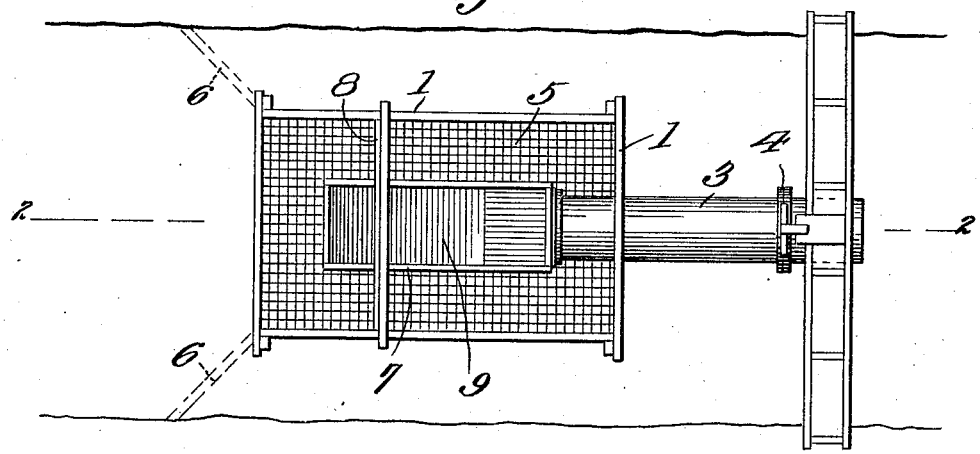
Fig. 1 is a top plan view of the preferred form of the invention, applied.
Figure 2:
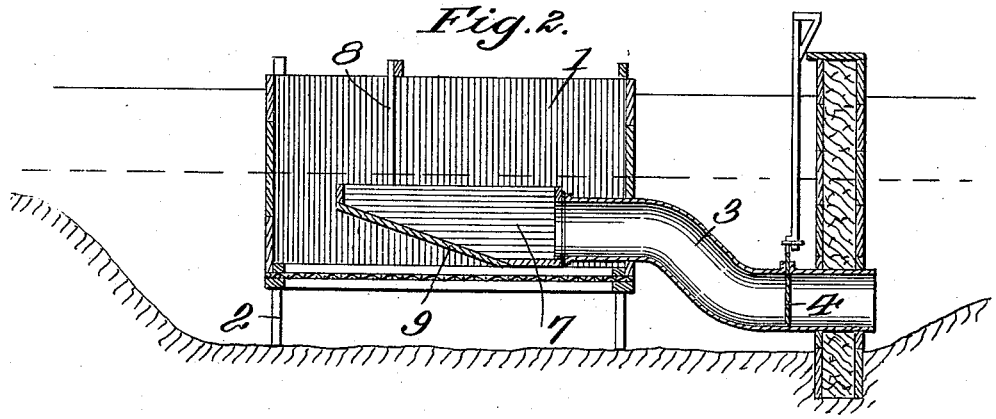
Fig. 2 is a central, vertical, longitudinal cross section through Fig. 1.

In the preferred form of the invention, an enclosing box or crib 1 is provided, having suitable corner posts 2 adapted to be driven into or secured in the bed of the ditch to solidly anchor the crib. The walls of the crib extend from a point which will be above extreme high water mark of the ditch to a point slightly above the bottom of the ditch, as shown. In use, the crib will be located just above the dam and the outlet pipe 3 of the dam will extend through the nearest end wall of the crib and a short distance within the crib, for a purpose to be later disclosed. The usual regulating gate 4 may be provided in the outlet pipe. Obviously, several pipes may be used instead of one, with a gate for each pipe. Evidently, any water flowing from the ditch through the outlet pipe or pipes must first enter the crib. But, since the walls of the box extend upwardly from a level near the bottom of the ditch to a point considerably above the extreme high water mark, it is obvious that the water must enter the crib from below and in an upward direction. This, with any current likely to be encountered in the irrigation ditch, will eliminate all débris floating on or near the surface of the stream so that none of that will reach the upstream end of the outlet pipe. But any submerged débris might possibly work beneath the lower edge of the crib and rise into the end of the outlet pipe and clog or choke it. Fish, of course, could easily pass out. To prevent the passage of fish, the bottom of the crib is completely screened as at 5. which also prevents the passage of any débris upwardly into the crib. In cases where the ditch is considerably wider than the crib, wings 6 may be extended from the crib edges to the ditch walls to direct the flow of water toward and beneath the box, as will be clear.

As is well known, the tendency of the water flowing upwardly through the screen would be to concentrate its flow close to the end of the outlet pipe or pipes, where the flow is generated, the result being a much greater volume of water rushing upwardly through that part of the screen in the same length of time than through the rest of the screen. The natural result would be a gradual collection, at that point, of any débris in the water and a possible clogging of the screen at that point. The water would then pass upwardly through the next nearest point and clog that and so on until the whole screen became clogged. To avoid this, a regulator or current-checking or regulating funnel or funnel-shaped box 7 is used. This funnel is connected onto the end of the outlet pipe or pipes and is supported in place by suitable brackets 8 on the crib 1. In the preferred form, it is of substantially triangular shape in vertical longitudinal cross-section, being of considerably less depth at its upstream end than at its downstream end, with its closed base or bottom 9 steeply inclined from the downstream to the upstream end. The upper side of the funnel is open and substantially parallel with the surface of the stream and screen 5, the funnel being so arranged that the lower edge of the down-stream end is only a slight distance above the screen, leaving a wedge shaped space or interval between the bottom of the funnel and the screen. This intercepts and checks the flow of water most where it would be greatest—at the entrance to the outlet pipe—and backs it up, so that the upward flow of the water through the screen becomes uniform at all points. Also, since the water must flow over the edge of the funnel box 1, in order to pass into the outlet pipe, such extended edge or outline of the outlet draws the water up through an equally extended area of the screen, further insuring distribution of the current and uniformity of flow and eliminating, to a great extent, the tendency to clog by accumulation of débris.

In some instances, especially in the smaller ditches, and where the flow is slow and comparatively small, the downstream end of the crib may be built right into the dam and its upper edge cut down to provide an outlet, spill-way, or weir somewhat lower than the crib sides and dam. In such cases, the outlet pipe and gate might be unnecessary, and the funnel also could be eliminated. This arrangement would be suitable for only the smaller ditches, as above stated, and is not a preferred form, even for them. The construction just described is so obvious that it hardly seems that it would be made clearer by illustration.

Figure 3:
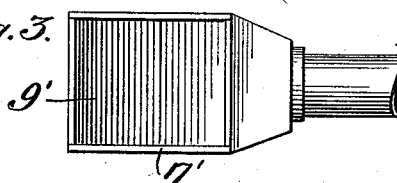
Fig. 3 is a top plan view of a modified form of funnel.
Figure 4:
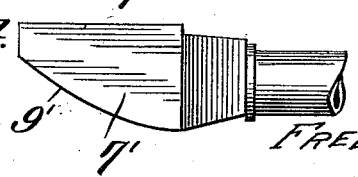
Fig. 4 is a side elevation of Fig. 3.

In Figs. 3 and 4 a modified form of funnel 7' is shown, the main differences between it and the preferred form being that this modified form is considerably wider in proportion to the diameter of the outlet pipe, and its lower face or wall 9' is slightly curved instead of being a true incline. The wider funnel gives increased area for checking and regulating the flow of water, as will be readily understood, and the curved surface has a somewhat more gradual effect in checking and regulating the flow, than in the case of the flat incline. This modification is more desirable in the larger ditches than in the smaller ones.

The crib shown is rectangular in shape and the funnel is rectangular in top plan view. Obviously, either or both may be made circular, annular, elliptical, triangular or any one of a number of various forms or shapes without in the least degree departing from the spirit and intention of the invention. Likewise, though wood or sheet metal will most likely be used, it is clear that concrete, stone, brick, tile and various other materials may be resorted to in various circumstances.

It is thought that the construction, operation, and use of the invention will be clear from the preceding detailed description.

Clearly, many changes may be made in the construction, arrangement and disposition of the several parts of the invention within the scope of the claims without in any way departing from the field of the invention, and it is meant to include all such within this application, wherein only preferred forms have been illustrated, by way of example.

Having thus described my invention, what I claim and desire to protect by Letters Patent is:

1. A fish screen comprising, a stationary crib, means for securing said crib in such position that the water will flow upwardly through its lower side, a flow spreading device in said crib and communicating with an outlet, and an outlet leading from said crib.

2. A fish screen comprising a stationary crib, means for securing said crib in a stream in such position that the water will flow upwardly through its lower side, means extending across said lower side and adapted to exclude fish therefrom, a flow spreading device in said crib, and an outlet leading from said crib.

3. A fish screen comprising, a stationary crib, means for securing said crib slightly above the bottom of a stream, means extending across the lower side of said crib and adapted to exclude fish therefrom, an outlet from said crib, and a funnel within said crib and communicating with said outlet, said funnel being provided with means for regulating the upward flow of water to the interior of said crib.

4. A fish screen comprising, a stationary crib, means for securing said crib slightly above the bottom of a stream, means extending across the lower side of said crib and adapted to exclude fish therefrom, an outlet from said crib, and a funnel within said crib and communicating with said outlet, said funnel having a lower wall inclined from the down-stream end to the upstream end.

5. A fish screen comprising a crib, means for placing said crib in a stream in such position that the water will flow upwardly through its lower side, means extending across said lower side and adapted to exclude fish therefrom, means within said crib spaced from the bottom thereof and adapted to intercept and spread the upflowing current, and an outlet leading from said crib.

6. A fish screen comprising a crib, means for placing said crib in a stream in such position that the water will flow upwardly through its lower side, means extending across said lower side and adapted to exclude fish therefrom, an outlet leading from said crib and means within said crib, attached to said outlet, spaced from the bottom of said crib and adapted to intercept and spread the upflowing current of water.

7. A fish screen comprising a crib, means for placing said crib in a stream in such position that the water will flow upwardly through its lower side, means extending across said lower side and adapted to exclude fish therefrom, an outlet leading from said crib, and an intake delivering to said outlet and provided with an upwardly directed opening of greatly enlarged outline relatively to the aforesaid outlet.

8. A fish screen comprising a crib, means for placing said crib in a stream in such position that the water will flow upwardly through its lower side, means extending across said lower side and adapted to exclude fish therefrom, an outlet leading from said crib, and an intake delivering to said outlet and provided with an upwardly directed opening of greatly enlarged outline relatively to the aforesaid outlet, said intake being provided with a bottom wall spaced from said fish excluding means and adapted to intercept and spread the upflowing current of water.

Signed at Portland, Oregon, this 18th day of October, 1921.

FREDERICK G. HURST.

Witnesses:
C. C. WOODWARD,
J. F. COMPTON.